June 21, 1932.  J. FOUCAULT  1,863,978

COUPLING FOR PIPES WITH THREADED ENDS

Filed Oct. 28, 1929

J. Foucault
INVENTOR
By Mark Kluk
ATTY.

Patented June 21, 1932

1,863,978

UNITED STATES PATENT OFFICE

JACQUES FOUCAULT, OF MYSLOWICE, POLAND

COUPLING FOR PIPES WITH THREADED ENDS

Application filed October 28, 1929, Serial No. 403,068, and in Belgium April 25, 1929.

The present invention relates to improvements in couplings for pipes with threaded ends, known per se, which comprise two nuts screwed to the ends of the respective pipes and so disposed that the ends of said pipes can be brought together, with the interposition of an elastic packing member. One of the said nuts, termed the male member, comprises for this purpose a flange which can be retained in a suitable recess formed in the other nut, termed the female member, which can be made in one or two pieces.

With such devices, it may happen that by reason of a violent lateral strain, the said packing will be given a permanent deformation which is sufficient to cause leakage.

In conformity to the invention, the device is so arranged that there will be no play between the flange of the male member and the walls of the recess of the female member, and the pipes and their coupling pieces thus form a rigid device whereby all risk of deformation of the said packing will be obviated.

The said female member may consist firstly of a single piece with a lateral slot, or secondly of two pieces without slot, which are screwed together. The flange of the male member is provided in the first case with projections on its lower face, and in the second case it will be without such projections.

In the case in which the said flange is provided with such lower projections, that is, when parts are united by the lateral fitting of the male member into the slot of the female member, the said projections are given a height such that the thickness of the flange is equal to the height of the cooperating recess in the female member. However the said slot is suitably notched for the insertion of the said projections of the flange, when the flange is fitted into the slot.

The accompanying drawing shows by way of example various embodiments of the invention:

Figs. 1 and 2 are respectively an elevational and a bottom plan view of a male member of a coupling device adapted for side fitting, according to the invention.

In Figures 1 to 6 it is observed that 7 and 8 are respectively the male and the female members of a side-fitting pipe coupling of the known type.

Figure 1:
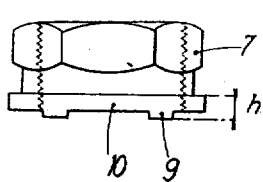
Figure 3:
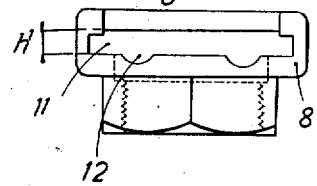
Figs. 3 and 4 are corresponding views of the female member.
Figure 2:
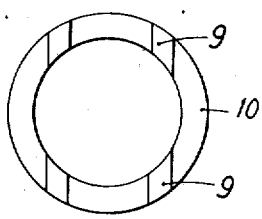
Figure 4:
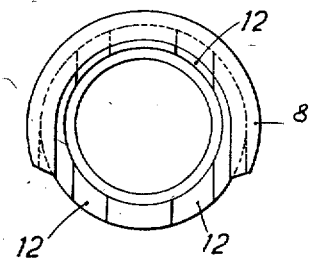
Figure 5:
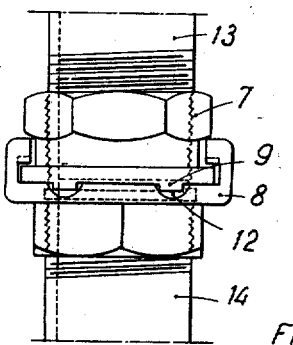
Fig. 5 shows the side-fitting device with the parts in place during the assembling.

In conformity to the invention, the male member 7 comprises on its lower face four projections 9 which (as shown in Figure 1) give to the flange 10 of said member a height $h$ which is equal to the height $h'$ of the cooperating recess 11 in the female member 8.

The said female member comprises on its entering slot suitable notches 12 whose depth and spacing correspond to the said projections 9 of the male member 7.

The laterally movable coupling, thus improved, is employed practically in the same manner as an ordinary coupling. The ends of the pipes 13—14 are first engaged in the respective members 7 and 8, and the flange 10 of the male member 7 is inserted into the said entering slot of the female member, care being to place the projections 9 in coincidence with the notches 12.

The male member 7 is then turned upon the female member, thus bringing together the ends of the pipes 13—14, with the interposition of a flexible packing washer 24.

Since the thickness of the flange 10 in addition to that of the said projections 9 corresponds to the thickness of the recess 11, the device formed by the pipes 13—14 and the members 7—8 is quite rigid, and the flexible washer interposed between the ends of the pipes will thus be well protected against deformations.

Figure 6:
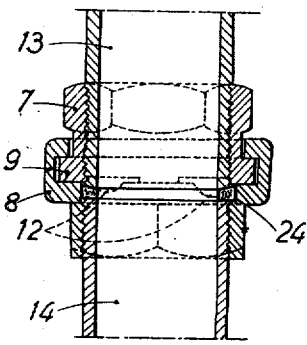
Fig. 6 is a sectional view of the same when the device has been tightened up.

It is quite necessary, when the device has been put together, to leave the projections 9 out of coincidence with the notches 12, as shown in Figure 6, so that the device will hold fast.

It is preferable to give to the thickness $h$ of the male member 10 a value which is very slightly above that of the thickness $h'$ of the recess 11, thus obtaining a certain pressure between the parts of the device by which the risks of loosening will be further reduced.

Figure 7:
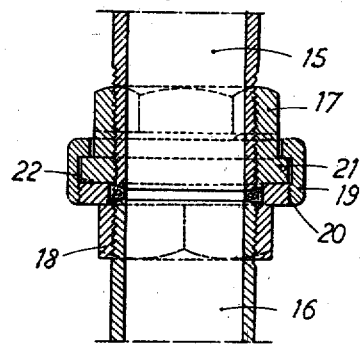
Fig. 7 is a sectional view of a coupling device in which the female member is made in two parts.

In the construction shown in Figure 7, the male member 17 which is screwed to the threaded end of the pipe 15 resembles the male member of the preceding figures, but in Figure 7, the female member mounted on the end of the pipe 16 consists of two members 18—19 which are screwed together at 20.

By more or less screwing the part 19 upon the part 18, the height of the recess of the female member can be varied, and hence when these two parts have been placed end to end, this height can be accurately adjusted to the thickness of the flange 21 of the male member, thus strongly pressing together, according to the plane 22, the contact surface portions of the parts 17 and 18.

The device shown in Figure 7 is assembled as follows. The member 18 is screwed to the pipe 16, and the part 17, preliminarily surrounded by the part 19, is fitted to the end of the pipe 15. The part 19 is then screwed to the part 18 until it meets the member 17. This latter is then turned so as to bring the end of the pipe 15 against the end of the pipe 16, with the interposition of the flexible packing 23. The part 19 is then tightened up closely, thus forming a very rigid device, and the said packing is well protected against deformation.

I claim:

A coupling device for pipes with threaded ends, in which the ends of the pipes are brought together with the interposition of a flexible packing washer, said device comprising two members whereof one is a male member and comprises a flange while the other is a female member having a lateral insertion recess in which is engaged the flange, and cooperating means on said members so that when in mutual engagement with each other, the height of the said flange of the male member and the height of the recess of the female member will be made exactly equal, said means including the provision of notches in the bottom of the insertion recess situated laterally and transversely of the pipe ends, and corresponding projections on the outer end of the male member for cooperating with the notches and the walls of the recess.

In testimony whereof he has signed this specification.

JACQUES FOUCAULT.